United States Patent
Huang et al.

(10) Patent No.: US 12,079,580 B2
(45) Date of Patent: Sep. 3, 2024

(54) INFORMATION EXTRACTION METHOD, EXTRACTION MODEL TRAINING METHOD, APPARATUS AND ELECTRONIC DEVICE

(71) Applicant: Beijing Baidu Netcom Science and Technology Co., Ltd., Beijing (CN)

(72) Inventors: Tao Huang, Beijing (CN); Baohui Wang, Beijing (CN); Li Liu, Beijing (CN); Litao Zheng, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 446 days.

(21) Appl. No.: 17/348,306

(22) Filed: Jun. 15, 2021

(65) Prior Publication Data
US 2021/0312230 A1 Oct. 7, 2021

(30) Foreign Application Priority Data

Nov. 30, 2020 (CN) .......................... 202011375463.8

(51) Int. Cl.
*G06F 40/30* (2020.01)
*G06F 18/21* (2023.01)
(Continued)

(52) U.S. Cl.
CPC ............ *G06F 40/30* (2020.01); *G06F 18/213* (2023.01); *G06F 18/2163* (2023.01);
(Continued)

(58) Field of Classification Search
None
See application file for complete search history.

(56) References Cited

U.S. PATENT DOCUMENTS

| 2019/0278846 A1* | 9/2019 | Xiang | ..................... G06F 16/00 |
| 2020/0226400 A1* | 7/2020 | Corring | ................. G06V 10/82 |

(Continued)

FOREIGN PATENT DOCUMENTS

| CN | 103440252 A | 12/2013 |
| CN | 105260360 A | 1/2016 |

(Continued)

OTHER PUBLICATIONS

Extended European Search Report corresponding to European Patent Application No. 21179348.4, dated Dec. 1, 2021 (13 pages).

(Continued)

*Primary Examiner* — Leon Viet Q Nguyen
(74) *Attorney, Agent, or Firm* — Maginot, Moore & Beck LLP

(57) ABSTRACT

An information extraction method, an extraction model training method, an apparatus and an electronic device all relate to knowledge graphs. A specific implementation includes acquiring an input text and determining a semantic vector of the input text according to the input text. Such implementation also includes inputting the semantic vector of the input text to a pre-acquired extraction model to obtain a first enhanced text of the input text. The first enhanced text is a text with a text score greater than a preset threshold output by the extraction model. The extraction model performs text extraction based on the semantic vector of the input text. Since the semantic vector has rich context semantics, the enhanced text extracted by the extraction model can be more in line with the context of the input text.

7 Claims, 3 Drawing Sheets

(51) Int. Cl.
*G06F 18/213* (2023.01)
*G06F 18/22* (2023.01)
*G06F 40/279* (2020.01)
*G06N 3/08* (2023.01)

(52) U.S. Cl.
CPC ............ *G06F 18/22* (2023.01); *G06F 40/279* (2020.01); *G06N 3/08* (2013.01)

(56) References Cited

U.S. PATENT DOCUMENTS

| | | | |
|---|---|---|---|
| 2021/0042474 A1* | 2/2021 | Liu | G06N 3/084 |
| 2021/0406476 A1 | 12/2021 | Pan et al. | |
| 2023/0016365 A1* | 1/2023 | Qiu | G06F 40/30 |

FOREIGN PATENT DOCUMENTS

| | | | |
|---|---|---|---|
| CN | 106528655 A | 3/2017 | |
| CN | 109344403 A | 2/2019 | |
| CN | 110263323 A | 9/2019 | |
| CN | 110705211 A | 1/2020 | |
| CN | 111291568 A | 6/2020 | |
| CN | 111324744 A | 6/2020 | |
| CN | 111444721 A | 7/2020 | |
| CN | 111767732 A | 10/2020 | |
| CN | 111859951 A | 10/2020 | |
| CN | 111967268 A | 11/2020 | |
| JP | 2020140673 A | 9/2020 | |
| KR | 20140059877 A | 5/2014 | |

OTHER PUBLICATIONS

Sahrawat, Dhruva, et al. "Keyphrase extraction as sequence labeling using contextualized embeddings." European Conference on Information Retrieval. Springer, Cham, 2020.
Jurafsky, Daniel, and James H. Martin. "Regular Expressions, Text Normalization, Edit Distance." Speech and Language Processing (2018): 1-28.
Machine translation of CN110705211A. (20 Pages).
Machine translation of CN111767732A. (25 Pages).
Machine translation of CN106528655A. (16 Pages).
Machine translation of CN111324744A. (24 Pages).
Machine translation of CN111444721A. (14 Pages).
Japanese Office Action corresponding to Japanese Patent Application No. 2021-143157, dated Aug. 30, 2022 (4 pages).
English Machine translation of Japanese Office Action corresponding to Japanese Patent Application No. 2021-143157, dated Aug. 30, 2022 (4 pages).
Machine translation of JP2020140673A. (28 Pages).
Chinese Office Action corresponding to Chinese Patent Application No. 202011375463.8, dated Apr. 11, 2024 (8 pages).
English translation of Chinese Office Action corresponding to Chinese Patent Application No. 202011375463.8, dated Apr. 11, 2024 (6 pages).

* cited by examiner

INFORMATION EXTRACTION METHOD, EXTRACTION MODEL TRAINING METHOD, APPARATUS AND ELECTRONIC DEVICE

CROSS-REFERENCE TO RELATED APPLICATION

The present application claims priority to Chinese patent application No. 202011375463.8 filed in China on Nov. 30, 2020, a disclosure of which is incorporated herein by reference in its entirety.

TECHNICAL FIELD

The present disclosure relates to the technical field of knowledge graphs in the artificial intelligence field. Specifically, an information extraction method, an extraction model training method, an apparatus and an electronic device are provided.

BACKGROUND

Content style enhancement can perform automatic style enhancement to specific content in a webpage or a text. As a tool for information extraction, the content style enhancement may also be applied to other natural language processing tasks, such as content abstract extraction, selling point extraction and other fields.

The content style enhancement can identify and extract a core fragment with strong attractiveness in an original text, and then present the core fragment in a specific style to enhance attractiveness.

SUMMARY

The present disclosure provides an information extraction method, an extraction model training method, an apparatus and an electronic device.

According to a first aspect of the present disclosure, an information extraction method is provided, including acquiring an input text and determining a semantic vector of the input text according to the input text. The method also includes inputting the semantic vector of the input text to a pre-acquired extraction model to obtain a first enhanced text of the input text.

According to a second aspect of the present disclosure, an extraction model training method is provided, including acquiring a training sample, where the training sample includes a training text and an annotation of the training text, and determining a semantic vector of the training sample according to the training sample. The method also includes using the semantic vector of the training sample to train a basic model to obtain an extraction model, where input of the extraction model includes a semantic vector of an input text, and output of the extraction model includes a first enhanced text of the input text.

According to a third aspect of the present disclosure, an information extraction apparatus is provided, including a first acquiring module, a determining module, and a second acquiring module. The first acquiring module is configured to acquire an input text. The determining module is configured to determine a semantic vector of the input text according to the input text. The second acquiring module is configured to input the semantic vector of the input text to a pre-acquired extraction model to obtain a first enhanced text of the input text.

According to a fourth aspect of the present disclosure, an extraction model training method is provided, including an acquiring module, configured to acquire a training sample, where the training sample includes a training text and an annotation of the training text. The method also includes a determining module, configured to determine a semantic vector of the training sample according to the training sample. The method also includes a training module, configured to use the semantic vector of the training sample to train a basic model to obtain an extraction model, where input of the extraction model includes a semantic vector of an input text, and output of the extraction model includes a first enhanced text of the input text.

According to a fifth aspect of the present disclosure, an electronic device is provided, including at least one processor, and a memory communicatively connected with the at least one processor. The memory stores instructions executable by the at least one processor, and the instructions are executed by the at least one processor to cause the at least one processor to implement the method according to any one of the first aspect, or cause the at least one processor to implement the method according to any one of the second aspect.

According to a sixth aspect of the present disclosure, a computer-readable storage medium is provided, and the computer-readable storage medium stores computer instructions which are configured to cause the computer to execute the method according to any one of the first aspect, or cause the at least one processor to implement the method according to any one of the second aspect.

It should be understood that the content described in this section is not intended to identify the key or important features of the embodiments of the present disclosure, nor is it intended to limit the scope of the present disclosure. Other features of the present disclosure will be easily understood through the following description.

BRIEF DESCRIPTION OF THE DRAWINGS

The accompanying drawings are used to better understand the solution, and do not constitute a limitation to the present disclosure. Among them.

DETAILED DESCRIPTION

The following describes exemplary embodiments of the present disclosure with reference to the accompanying drawings, which include various details of the embodiments of the present disclosure to facilitate understanding, and should be regarded as merely exemplary. Therefore, those of ordinary skill in the art should recognize that various changes and modifications can be made to the embodiments described herein without departing from the scope and spirit of the present disclosure. Likewise, for clarity and conciseness, descriptions of well-known functions and structures are omitted in the following description.

Figure 1:
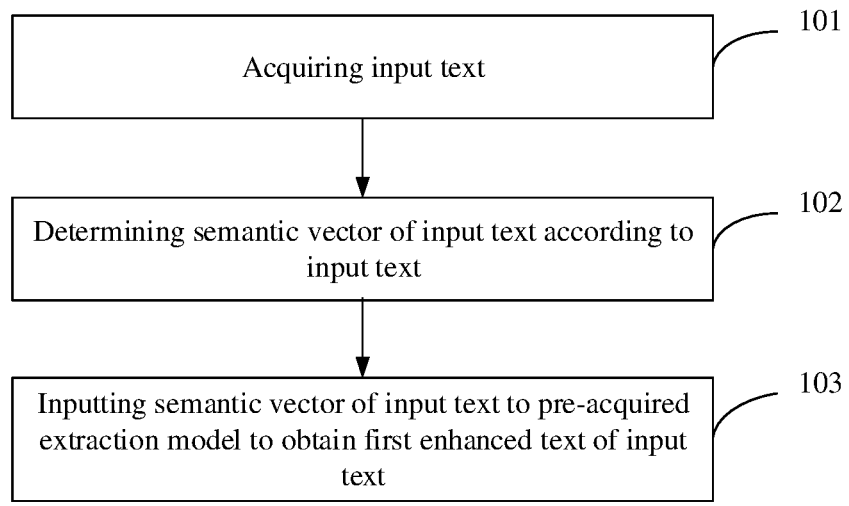
FIG. 1 is a flowchart of an information extraction method according to an embodiment of the present disclosure.

Referring to FIG. 1, FIG. 1 is a flowchart of an information extraction method according to an embodiment of the present disclosure; as shown in FIG. 1, the present embodiment provides an information extraction method, including the following steps:

Step 101: acquiring an input text.

The input text may be understood as a paragraph of text, and the input text is a text that needs enhanced text extraction. The input text may be a text acquired from a webpage or landing page, such as a text acquired from a title of the landing page, or a text acquired from a webpage snapshot or an image according to image recognition technology, for example, a text acquired from an advertisement copy image.

Step 102: determining a semantic vector of the input text according to the input text.

When determining the semantic vector of the input text, a neural network model, for example, a Bidirectional Encoder Representations from Transformers (BERT), may be used to determine the semantic vector of the input text.

Step 103: inputting the semantic vector of the input text to a pre-acquired extraction model to obtain a first enhanced text of the input text, where the first enhanced text is a text with a text score greater than a preset threshold output by the extraction model.

The extraction model is pre-trained, and the extraction model outputs the text with a text score greater than the preset threshold, so that the number of texts included in the first enhanced text is not limited to one. The preset threshold may be set according to the actual situation, which is not limited here. The extraction model analyzes based on the semantic vector, obtains the text score of one or more texts of the input text, and outputs the text with a text score greater than the preset threshold.

In a case that there are multiple texts with their text scores greater than the preset threshold, the multiple texts are output, and then the first enhanced text includes the multiple texts. In a case that there is one text with its text score greater than the preset threshold, one text is output, and the first enhanced text includes this text.

The first enhanced text may be understood as a text that reflects core semantics of the input text, or the first enhanced text is a text that needs more attention in the input text. After the first enhanced text is acquired, the first enhanced text in the input text may be highlighted, bolded, or marked in red to make the display of the first enhanced text more eye-catching, for example, in a case that the input text is from an advertisement copy image, the first enhanced text in the advertisement copy may be style-enhanced according to the first enhanced text, so as to highlight the information and increase the attractiveness of the advertisement.

In this embodiment, an input text is acquired: a semantic vector of the input text is determined according to the input text: the semantic vector of the input text is input to the pre-acquired extraction model to obtain a first enhanced text of the input text, where the first enhanced text is a text with a text score greater than a preset threshold output by the extraction model. The extraction model performs text extraction based on the semantic vector of the input text. Since the semantic vector has rich context semantics, the enhanced text extracted by the extraction model can be more in line with the context of the input text.

In the above step 103, after inputting the semantic vector of the input text to the pre-acquired extraction model to obtain the first enhanced text of the input text, the method further includes:

performing boundary correction on the first enhanced text according to the input text to obtain a target enhanced text.

The boundary division of the first enhanced text output by the extraction model may be inaccurate. For example, in a case that an input text is "high-alcohol content red wine, full of fruity taste and elegance of one more degree", an acquired first enhanced text is "high-alcohol content red", the boundary "red" is not accurate, and the correct boundary is "wine". In this case, it is necessary to correct the boundary of the first enhanced text according to the input text to determine the correct boundary so as to obtain the target enhanced text. In the above example, after correction, an acquired target enhanced text is "high-alcohol content red wine".

In the above, the boundary correction is performed on the first enhanced text according to the input text to further correct the accuracy of the first enhanced text, so that the target enhanced text has a correct boundary, the target enhanced text is more in line with the actual situation, and the accuracy of the target enhancement text is improved.

When performing boundary correction on the first enhanced text, word segmentation processing may be performed first on the input text to obtain a word segmentation result, and then boundary correction is performed on first and last positions of the first enhanced text according to the word segmentation result, that is, the performing boundary correction on the first enhanced text according to the input text to determine the target enhanced text, includes:

performing word segmentation on the input text to obtain a word segmentation result;

performing boundary correction on the first and last positions of the first enhanced text according to the word segmentation result to obtain the target enhanced text.

For example, word segmentation is performed on the input text "high-alcohol content red wine, full of fruity taste and elegance of one more degree", and the obtained word segmentation results include "high", "alcohol content", "red wine", "fruity", "full", "more", "one degree", "of" and "elegance", the first enhanced text is "high-alcohol content red", the word segmentation result of the input text is used to correct the characters "high" and "red" at two ends of the first enhanced text to obtain the target enhanced text so as to improve the accuracy of the target enhanced text.

The performing boundary correction on first and last positions of the first enhanced text according to the word segmentation result to obtain the target enhanced text includes:

in a case that the first or last position of the first enhanced text does not match the word segmentation result, supplementing the first or last position of the first enhanced text according to the word segmentation result to obtain the target enhanced text.

The first or last position of the first enhanced text does not match the word segmentation result, which may be understood as in a case that the first position of the first enhanced text is not included in the word segmentation result, the first position of the first enhanced text is supplemented according to the word segmentation result: in a case that the last position of the first enhanced text is not included in the word segmentation result, the last position of the first enhanced text is supplemented according to the word segmentation result. For example, in the above example, a character at the first position of the first enhanced text is "high", and the word segmentation result of the input text includes the first position with a word segmentation boundary of "high", then the boundary of the first position of the first enhanced text is correct, and no boundary correction is required; a character at the last position of the first enhanced text is "red", and the word segmentation result of the input text does not include the last position with a word segmentation boundary of "red", then the boundary of the last position of the first enhanced text is incorrect, and a boundary correction is required, the "red wine" in the word segmentation result is used to correct the boundary "red", and the character "wine" in the first enhanced text is supplemented, and the target enhanced text obtained is "high-alcohol content red wine".

In the above, in a case that the first or last position of the first enhanced text does not match the word segmentation result, then the first or last position of the first enhanced text is supplemented according to the word segmentation result to obtain the target enhanced text, so as to improve the accuracy of target enhanced text.

Figure 2:
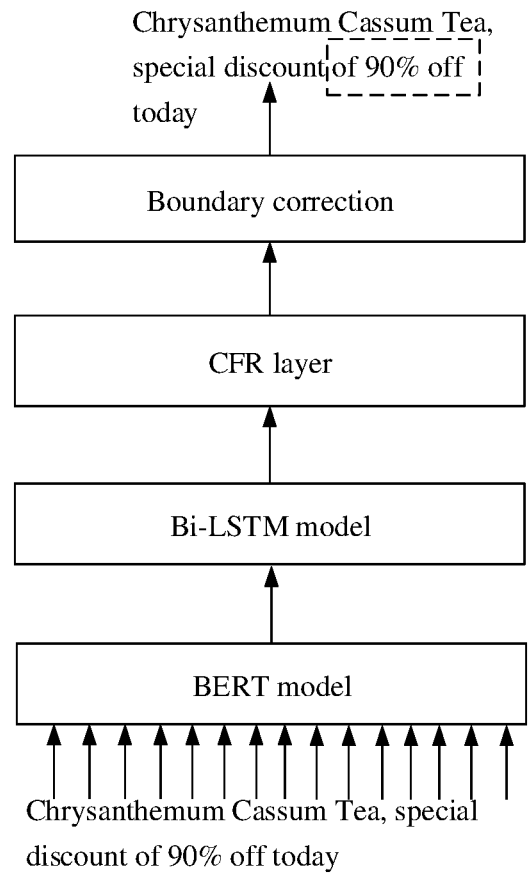
FIG. 2 is another flowchart of an information extraction method according to an embodiment of the present disclosure.

As shown in FIG. 2, an input text is "*Chrysanthemum cassum* Tea, special discount of 90% off today", A semantic vector of the input text is obtained through a BERT model, then the semantic vector sequentially passes a Bi-directional Long Short-Term Memory (Bi-LSTM) model and a Conditional Random Fields (CRF) layer, an output of the CRF layer is a first enhanced text, word segmentation boundary correction is performed on the first enhanced text to obtain a target enhanced text "special discount of 90% off", i.e. a part shown in a dashed box in FIG. 2 is the target enhanced text. The extraction model may use cascaded BI-LSTM model and CRF layer.

By fine-tuning the BERT model with training samples, better word embedding representation can be obtained. The process of training the BI-LSTM model and the CRF layer is also a process of fine-tuning the BERT model. Compared with a static word vector used in a traditional sequence labeling method, more context information and position information is introduced during the extraction model training process, and the semantic vector is dynamically generated according to the context of the word, and has richer context semantics, and can better solve the problem of enhancement ambiguity. Performing boundary correction on the first enhanced text output by the extraction model enables the model to better fit the actual scenario, further enhance the accuracy of the extraction model, and provides support for the automatic style enhancement of the text in the landing page field.

In the above, the determining the semantic vector of the input text according to the input text, includes:
   performing identification conversion on each word in the input text to obtain an identification sequence of identifications which are corresponding to words in a one-to-one manner;
   inputting the identification sequence to the Bidirectional Encoder Representations model from Transformers to obtain the semantic vector of the input text.

Specifically, each word in the input text is converted into the identification sequence, that is, the input text is analyzed in units of word. Different words correspond to different identifications, and the words and the identifications have a one to one correspondence. The identification may be a number or character, which is not limited here. After converting the input text into the identification sequence, the identification sequence is input to the BERT to obtain semantic vectors of the input text, and one word in the input text corresponds to one semantic vector.

The BERT is a language model that is based on transformer. By self-attention mechanism, a feature vector (i.e., semantic vector) of each word can fully consider context information.

There are two main training methods of the BERT model, one method is to train by randomly masking a preset proportion of words (such as 15%), in a case that the model predicts the masked words accurately, it indicates the semantic vector trained by this method is also relatively good. The other method is to train by predicting whether two sentences should be connected together. The BERT does not require labels during the training process, and it can be trained as long as there is corpus, so it can be trained unsupervised using a large-scale data set. The BERT model requires a huge corpus data and computing force, the Bert model can download well-trained models from the network, and then use training samples to fine-tune to obtain the final BERT model. In the process of training the BI-LSTM model and the CRF layer, the BERT model is fine-tuned and the final BERT model is obtained.

The input of the BERT model is the identification sequence. Similarly, the output from the extraction model is also a sequence in the form of identification, and the identification conversion is performed, that is, the identification is converted into the corresponding word, and the first enhanced text can be obtained.

In this embodiment, the Bidirectional Encoder Representations model from Transformers is used to determine the semantic vector of the input text. Since the Bidirectional Encoder Representations model from Transformers can dynamically generate the semantic vector according to the context of the word, so that the obtained semantic vector has richer context semantics, which is convenient for improving the accuracy of the first enhanced text when the extraction model extracts text based on the semantic vector subsequently.

Figure 3:
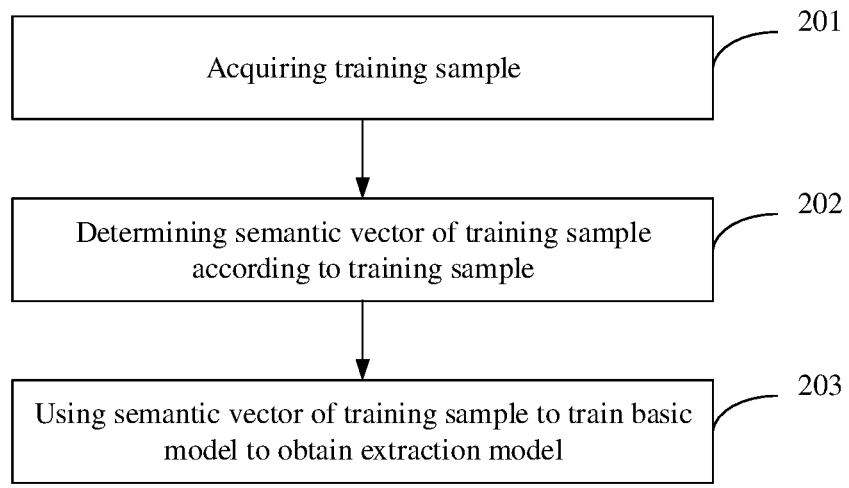
FIG. 3 is a flowchart of an extraction model training method according to an embodiment of the present disclosure.

Referring to FIG. 3, FIG. 3 is a flowchart of an extraction model training method according to an embodiment of the present disclosure. As shown in FIG. 3, this embodiment provides an extraction model training method, including the following steps:

Step 201: acquiring a training sample, where the training sample includes a training text and an annotation of the training text.

The training text may be a text acquired from a webpage or landing page, such as a text acquired from a title of the landing page, or a text acquired from a webpage snapshot or an image according to image recognition technology, for example, a text acquired from an advertisement copy image. An enhanced text is a text enhanced by styles of highlighting, bolding, or marking in red.

The training text is annotated so that the enhanced text in the training text can be annotated. For example, the training text may be annotated by an IOB (I means inside: O means outside; B means beginning) labeling rule, where B is used to identify the beginning of the enhanced text, and I is used to identify the inside and the ending of the enhanced text, O is used to identify other parts of the training text (that is, the non-enhanced text part). For example, for an enhanced text "special discount 90% off", it will be annotated as <B-COL, I-COL, I-COL, I-COL>, and the training text after the IOB annotation is used as the training sample to train the identification model.

Step 202: determining a semantic vector of the training sample according to the training sample.

When determining the semantic vector of the training text, a neural network model, for example, a Bidirectional Encoder Representations from Transformers (BERT), may be used to determine the semantic vector of the training text. The annotated training sample is inputted into the BERT model to obtain the semantic vector of the training sample.

Further, each word in the training text is converted into an identification sequence before inputted to the BERT model. Different words correspond to different identifications, and the words and the identifications have a one to one correspondence. The identification may be a number or character, which is not limited here. The identification sequence of the training text and the annotation of the training text are input into the BERT model together to obtain semantic vectors of the training text. One word in the training text corresponds to one semantic vector.

Step 203: using the semantic vector of the training sample to train a basic model to obtain an extraction model, where input of the extraction model includes a semantic vector of an input text, and output of the extraction model includes a first enhanced text of the input text.

The trained extraction model may extract the enhanced text from the input text and output the first enhanced text. That is, the extraction model outputs texts with a text score greater than a preset threshold, so that the number of texts included in the first enhanced text is not limited to one, and the preset threshold may be set according to actual conditions, which is not limited here. The extraction model analyzes based on the semantic vector, obtains the text score of one or more texts of the input text, and outputs the text with a text score greater than the preset threshold.

In a case that there are multiple texts with their text scores greater than the preset threshold, the multiple texts are output, and the first enhanced text includes the multiple texts. In a case that there is one text greater than the preset threshold, one text is output, and the first enhanced text includes this text.

The first enhanced text may be understood as a text that reflects core semantics of the input text, or the first enhanced text is a text that needs more attention in the input text. After the first enhanced text is acquired, the first enhanced text in the input text can be style-enhanced by highlighting, bold, or mark in red to make the display of the first enhanced text more eye-catching, for example, in a case that the input text comes from an advertisement copy image, the first enhanced text in the advertisement copy can be style-enhanced according to the first enhanced text, so as to highlight the information and increase the attractiveness of the advertisement.

The basic model may use cascaded BI-LSTM model and CRF layer. The semantic vector of the training sample is input into the Bi-LSTM model and the CRF layer in turn, the Bi-LSTM model and the CRF layer are trained, and the path is decoded through a state matrix and a transition matrix to obtain the optimal path, wherein the transition matrix represents a probability of transferring a label to another label. The extraction model is obtained after the training is completed. The extraction model analyzes based on the semantic vector, obtains a text score of one or more texts of the input text, and outputs the text with a text score greater than a preset threshold, and the output text is the first enhanced text. For example, for "*Chrysanthemum cassum* Tea, special discount of 90% off today", the first enhanced text output by the extraction model is "special discount of 90% off".

In this embodiment, a training sample is obtained, and the training sample includes training text and an annotation of the training text: the semantic vector of the training sample is determined according to the training sample; the semantic vector of the training sample is used to train a basic model to obtain an extraction model, the input of the extraction model includes the semantic vector of the input text, and the output of the extraction model includes the first enhanced text of the input text. The semantic vector is used to train the extraction model. Since the semantic vector has rich context semantics, the enhanced text extracted by the trained extraction model can be more in line with the context of the input text.

In the above, the acquiring a training sample, includes:
performing image recognition on text in a sample image to acquire an initial sample;
annotating a target text in the initial sample to obtain a training sample, where the target text is a text in the sample image that is processed by style enhancement.

Specifically, the initial sample may be obtained by recognizing a large number of sample images, for example, an advertisement copy image, and recognizing the style-enhanced text such as highlighted, marked in red, and bold text in the sample image as an enhanced text, since the recognition process may not be very accurate, manual inspection can be used to further annotate and correct the recognition result, such as annotating and correcting the enhanced text, correcting the recognized letter, and so on.

The initial sample includes the training text and the target text in the training text. The target text is the style-enhanced text in the sample image. The target text in the initial sample is annotated, to annotate the target text. For example, the training text may be annotated by an IOB (I means inside: O means outside; B means beginning) labeling rule, where B is used to identify the beginning of the enhanced text, and I is used to identify the inside and the ending of the enhanced text, O is used to identify other parts of the training text (that is, the non-enhanced text part). For example, for the enhanced text "special discount 90% off", it will be annotated as <B-COL, I-COL, I-COL, I-COL>, and the training text after the IOB annotation is used as the training sample to train the identification model.

In this embodiment, image recognition is performed on the text in the sample image to obtain the initial sample: the target text in the initial sample is annotated to obtain the training sample to train the extraction model, and the target text is the style-enhanced text in the sample image, so that the extraction model can extract the enhanced text in the input text, which provides support for the automatic style enhancement of the text in the landing page field.

By fine-tuning the Bi-LSTM model and CRF layer through training samples, a better word embedding representation can be obtained. Compared with a static word vector used in a traditional sequence labeling method, more context information and position information is introduced during the extraction model training process, and the semantic vector is dynamically generated according to the context of the word and has richer context semantics, and the problem of enhancement ambiguity can be better solved.

Figure 4:
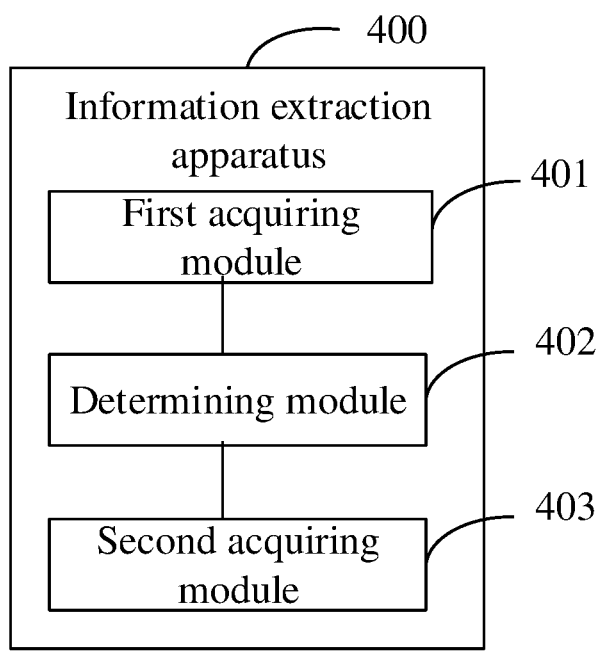
FIG. 4 is a structural diagram of an information extraction apparatus according to an embodiment of the present disclosure.

Referring to FIG. 4, FIG. 4 is a structural diagram of an information extraction apparatus according to an embodiment of the present disclosure. As shown in FIG. 4, the present embodiment provides an information extraction apparatus 400, including:
a first acquiring module 401, configured to acquire an input text;
a determining module 402, configured to determine a semantic vector of the input text according to the input text;
a second acquiring module 403, configured to input the semantic vector of the input text to a pre-acquired extraction model to obtain a first enhanced text of the input text.

Further, the information extraction apparatus 400 further includes:

a third acquiring module, configured to perform boundary correction on the first enhanced text according to the input text to obtain a target enhanced text.

Further, the third acquiring module includes:

a word segmentation submodule, configured to perform word segmentation on the input text to obtain a word segmentation result;

a first acquiring submodule configured to perform boundary correction on first and last positions of the first enhanced text according to the word segmentation result to obtain the target enhanced text.

Further, the first acquiring submodule is configured to:

in a case that the first or last position of the first enhanced text does not match the word segmentation result, supplement the first or last position of the first enhanced text according to the word segmentation result to obtain the target enhanced text.

Further, the determining module 402 includes:

a second acquiring submodule, configured to perform identification conversion on each word in the training text to obtain an identification sequence of identifications which are corresponding to words in a one-to-one manner;

a third acquiring submodule, configured to input the identification sequence into the BERT model to obtain the semantic vector of the input text.

The above-mentioned information extraction apparatus 400 can implement each process in the method embodiment of FIG. 1 and achieve the same technical effect. In order to avoid repetition, details are not described herein again.

The information extraction apparatus 400 of this embodiment acquires the input text, determine the semantic vector of the input text according to the input text: and inputs the semantic vector of the input text into the pre-acquired extraction model to obtain the first enhanced text of the input text, where the first enhanced text is a text with a text score greater than a preset threshold output by the extraction model. The extraction model performs text extraction based on the semantic vector of the input text. Since the semantic vector has rich context semantics, the enhanced text extracted by the extraction model can be more in line with the context of the input text.

Figure 5:
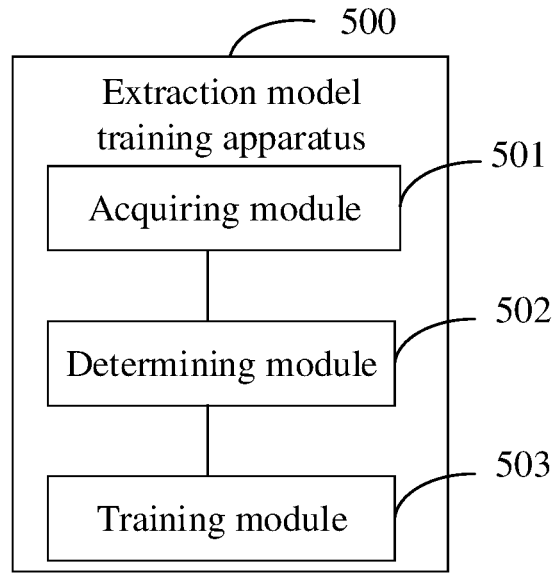
FIG. 5 is a structural diagram of an extraction model training apparatus according to an embodiment of the present disclosure.

Referring to FIG. 5, FIG. 5 is a structural diagram of an extraction model training apparatus according to an embodiment of the present disclosure. As shown in FIG. 5, the present embodiment provides an extraction model training apparatus 500, including:

an acquiring module 501, configured to acquire a training sample, where the training sample include training text and an annotation of the training text;

a determining module 502, configured to determine a semantic vector of the training sample according to the training sample;

a training module 503, configured to use the semantic vector of the training sample to train a basic model to obtain an extraction model, where input of the extraction model includes a semantic vector of an input text, and output of the extraction model includes a first enhanced text of the input text.

Further, the acquiring module 501 includes:

an acquiring submodule configured to perform image recognition on a text in a sample image to acquire an initial sample;

an annotating submodule configured to annotate a target text in the initial sample to obtain a training sample, where the target text is a style enhanced text in the sample image.

The above-mentioned extraction model training apparatus 500 can implement each process in the method embodiment of FIG. 3 and achieve the same technical effect. In order to avoid repetition, details are not described herein again.

The extraction model training apparatus 500 in this embodiment acquires a training sample, where the training sample includes a training text and an annotation of the training text: determines the semantic vector of the training sample according to the training sample; and uses the semantic vector of the training sample to train a basic model to obtain an extraction model, where the input of the extraction model includes the semantic vector of the input text, and the output of the extraction model includes the first enhanced text of the input text. The semantic vector is used to train the extraction model. Since the semantic vector has rich context semantics, the enhanced text extracted by the trained extraction model can be more in line with the context of the input text.

According to the embodiments of the present disclosure, an electronic device and a readable storage medium are further provided.

Figure 6:
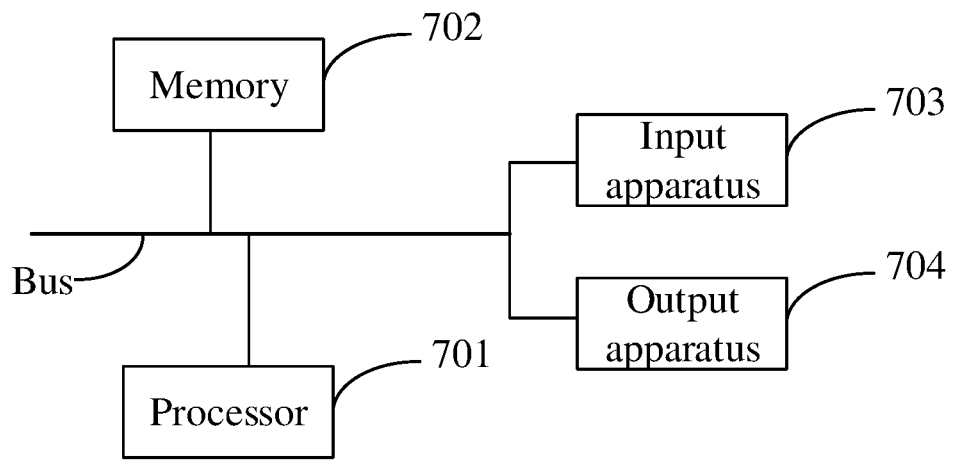
FIG. 6 is a block diagram of an electronic device for implementing the information extraction method according to an embodiment of the present disclosure.

As shown in FIG. 6, FIG. 6 is a flowchart of an electronic device for the information extraction method according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile devices, such as personal digital processing, cellular phones, intelligent phones, wearable devices, and other similar computing devices. The components shown here, their connections and relationships, and their functions are merely for illustration, and are not intended to be limiting implementations of the disclosure described and/or required herein.

As shown in FIG. 6, the electronic device includes: one or more processors 701, a memory 702, and interfaces for connecting various components, including a high-speed interface and a low-speed interface. The various components are interconnected using different buses and may be mounted on a common motherboard or otherwise installed as required. The processor may process instructions executed within the electronic device, wherein the instructions executed within the electronic device includes those instructions stored in or on a memory for displaying graphic information of a graphical user interface (GUI) on an external input/output device, such as a display device coupled to the interface. In other implementations, multiple processors and/or multiple buses may be used with multiple memories and multiple storages, if desired. Similarly, multiple electronic devices may be connected, each providing some necessary operations (for example, as a server array, a group of blade servers, or a multiprocessor system). One processor 701 is shown as an example in FIG. 6.

The memory 702 is a non-transitory computer-readable storage medium provided by the present disclosure. The memory stores instructions executable by at least one processor, so that the at least one processor executes the information extraction method provided in the present disclosure. The non-transitory computer-readable storage medium of the present disclosure stores computer instructions, which are used to cause a computer to execute the information extraction method provided by the present disclosure.

As a non-transitory computer-readable storage medium, the memory 702 may be used to store non-transitory software programs, non-transitory computer executable programs, and modules, such as a program instruction/module (for example, the first acquiring module 401, second determining module 402, and the second acquiring module 403 shown in FIG. 4) corresponding to the information extraction method in embodiments of the present disclosure. The processor 701 executes various functional applications and data processing of the server by running non-transitory software programs, instructions, and modules stored in the memory 702, that is, the information extraction method in embodiments of the foregoing method is implemented.

The memory 702 may include a program storage partition and a data storage partition, where the program storage partition may store an operating system and an application program required for at least one function, and the data storage partition may store data created for use by the electronic device of the information extraction. In addition, the memory 702 may include a high-speed random-access memory, and may also include a non-transitory memory, such as at least one magnetic disk storage device, a flash memory device, or other non-transitory solid-state storage device. In some embodiments, the memory 702 may optionally include a memory remotely disposed with respect to the processor 701, and the remote memory may be connected through a network to the electronic device of the information extraction. Examples of the above network include, but are not limited to, the Internet, an Intranet, a local area network, a mobile communication network and combinations thereof.

The electronic device of the information extraction method may further includes an input apparatus 703 and an output apparatus 704. The processor 701, the memory 702, the input apparatus 703, and the output apparatus 704 may be connected via a bus or other means. FIG. 6 has illustrated a connection via a bus as an example.

The input apparatus 703 can receive inputted numeric or character information, and generate a key signal input related to a user setting and function control of the electronic device of the information extraction method, such as a touch screen, a keypad, a mouse, a trackpad, a touchpad, a pointing stick, one or more mouse buttons, a trackball, a joystick or the like. The output apparatus 704 may include a display apparatus, an auxiliary lighting apparatus (e.g., an LED), a haptic feedback apparatus (e.g., a vibration motor) and the like. The display apparatus may include, but is not limited to, a liquid crystal display (LCD), a light emitting diode (LED) display, and a plasma display. In some embodiments, the display apparatus may be a touch screen.

The above-mentioned electronic device may also be an electronic device that performs the extraction model training method.

Various implementations of the systems and technologies described herein may be implemented in a digital electronic circuitry, an integrated circuit system, an application-specific integrated circuit (ASIC), computer hardware, firmware, software, and/or combinations thereof. These various embodiments may include: implementations in one or more computer programs, which can be executed by and/or interpreted on a programmable system including at least one programmable processor, the programmable processor may be application specific or general-purpose and can receive data and instructions from a storage system, at least one input apparatus and/or at least one output apparatus, and can transmit the data and instructions to the storage system, the at least one input apparatus, and the at least one output apparatus.

These computing programs (also known as programs, software, software applications or codes) include machine instructions of a programmable processor, and can be implemented using high-level procedures and/or object-oriented programming languages, and/or assembly/machine languages. As used herein, the terms "machine-readable medium" and "computer-readable medium" both refer to any computer program product, apparatus, and/or apparatus (e.g., a magnetic disk, an optical disk, a memory, a programmable logic device (PLD)) used to provide the machine instructions and/or data to a programmable processor, including machine-readable media that receive machine instructions as machine-readable signals. The term "machine-readable signal" refers to any signal used to provide machine instructions and/or data to a programmable processor.

To provide interaction with the user, the systems and technologies described herein can be implemented on a computer that has: a display apparatus (e.g., a cathode ray tube (CRT) or liquid crystal display (LCD) monitor) for displaying information to the user; and a keyboard and a pointing apparatus (e.g., a mouse or a trackball) through which the user can provide input to the computer. Other kinds of apparatuses may also be used to provide interaction with the user. For example, the feedback provided to the user may be any form of sensory feedback (e.g., a visual feedback, an auditory feedback, or a haptic feedback), and may be in any form (including an acoustic input, a voice input, or a haptic input) to receive input from the user.

The systems and technologies described herein can be implemented in a computing system that includes a back-end component (e.g., as a data server), or a middleware components (e.g., an application server), or a front-end component (e.g., a user computer with a graphical user interface or web browser through which the user can interact with the implementation of the systems and technologies described herein), or any combination of such back-end component, middleware component or front-end component. Various components of the system may be interconnected by digital data communication in any form or via medium (e.g., a communication network). Examples of a communication network include: a local area network (LAN), a wide area network (WAN) and the Internet.

The computer system may include a client and a server. The client and server are typically remote from each other and interact via a communication network. The client-server relationship is created by computer programs running on respective computers and having a client-server relationship with each other.

In the present disclosure, an input text is acquired: a semantic vector of the input text is determined according to the input text; the semantic vector of the input text is input into a pre-acquired extraction model to obtain a first enhanced text of the input text, where the first enhanced text is a text with a text score greater than a preset threshold output by the extraction model. The extraction model performs text extraction based on the semantic vector of the input text. Since the semantic vector has rich context semantics, the enhanced text extracted by the extraction model can be more in line with the context of the input text.

Boundary correction is performed on the first enhanced text according to the input text to further correct the accuracy of the first enhanced text, so that the target enhanced text has the correct boundary, and the target enhanced text is more in line with the actual situation, and the accuracy of the target enhanced text is improved.

The word segmentation result of the input text is used to correct the characters at both ends of the first enhanced text to obtain the target enhanced text so as to improve the accuracy of the target enhanced text.

In a case that the first or last position of the first enhanced text does not match the word segmentation result, the first or last position of the first enhanced text is supplemented according to the word segmentation result to obtain the target enhanced text, so that the accuracy of the target enhanced text is improved.

The Bidirectional Encoder Representations from Transformers model is used to determine the semantic vector of the input text. Since the Bidirectional Encoder Representations from Transformers model can dynamically generate the semantic vector according to the context of the word, so that the obtained semantic vector has richer context semantics, which is convenient for improving the accuracy of the first enhanced text when the extraction model extracts text based on the semantic vector subsequently.

A training sample is obtained, and the training sample includes training text and an annotation of the training text: the semantic vector of the training sample is determined according to the training sample: the semantic vector of the training sample is used to train a basic model to obtain an extraction model, where the input of the extraction model includes the semantic vector of the input text, and the output of the extraction model includes the first enhanced text of the input text. The semantic vector is used to train the extraction model. Since the semantic vector has rich context semantics, the enhanced text extracted by the trained extraction model can be more in line with the context of the input text.

Image recognition is performed on the text in the sample image to obtain the initial sample: the target text in the initial sample is annotated to obtain the training sample, where the target text is the style-enhanced text in the sample image, so that the extraction model can extract the enhanced text in the input text, which provides support for the automatic style enhancement of the text in the landing page field.

It should be understood that the various forms of processes shown above may be used, and steps may be reordered, added or removed. For example, various steps described in the present disclosure can be executed in parallel, in sequence, or in alternative orders. As long as the desired results of the technical solutions disclosed in the present disclosure can be achieved, no limitation is imposed herein.

The foregoing specific implementations do not constitute any limitation on the protection scope of the present disclosure. It should be understood by those skilled in the art that various modifications, combinations, sub-combinations and substitutions may be made as needed by design requirements and other factors. Any and all modification, equivalent substitution, improvement or the like within the spirit and concept of the present disclosure shall fall within the protection scope of the present disclosure.

What is claimed is:

1. An information extraction method, comprising:
  acquiring an input text;
  determining a semantic vector of the input text according to the input text; and
  inputting the semantic vector of the input text to a pre-acquired extraction model to obtain a first enhanced text of the input text;
  wherein the method further comprises: after inputting the semantic vector of the input text to the pre-acquired extraction model to obtain the first enhanced text of the input text;
  performing boundary correction on the first enhanced text according to the input text to obtain a target enhanced text;
  wherein determining the semantic vector of the input text according to the input text comprises:
  performing identification conversion on each word in the input text to obtain an identification sequence of identifications which correspond to words in a one-to-one manner; and
  inputting the identification sequence to a bidirectional encoder representation model from transformers to obtain the semantic vector of the input text.

2. The method according to claim 1, wherein performing boundary correction on the first enhanced text according to the input text to obtain the target enhanced text comprises:
  performing word segmentation on the input text to obtain a word segmentation result; and
  performing boundary correction on first and last positions of the first enhanced text according to the word segmentation result to obtain the target enhanced text.

3. The method according to claim 2, wherein performing boundary correction on the first and last positions of the first enhanced text according to the word segmentation result to obtain the target enhanced text comprises:
  in a case that the first or last position of the first enhanced text does not match the word segmentation result, supplementing the first or last position of the first enhanced text according to the word segmentation result to obtain the target enhanced text.

4. An electronic device, comprising
  at least one processor; and
  a memory communicatively connected with the at least one processor; wherein the memory stores instructions executable by the at least one processor, and the instructions are executed by the at least one processor to cause the at least one processor to implement:
  acquiring an input text;
  determining a semantic vector of the input text according to the input text;
  inputting the semantic vector of the input text to a pre-acquired extraction model to obtain a first enhanced text of the input text;
  wherein the instructions are executed by the at least one processor to cause the at least one processor to implement:
  performing boundary correction on the first enhanced text according to the input text to obtain a target enhanced text;
  wherein the instructions are executed by the at least one processor to cause the at least one processor to implement:
  performing identification conversion on each word in the input text to obtain an identification sequence of identifications which correspond to words in a one-to-one manner; and
  inputting the identification sequence to a bidirectional encoder representation model from transformers to obtain the semantic vector of the input text.

5. The electronic device according to claim 4, wherein the instructions are executed by the at least one processor to cause the at least one processor to implement:
  performing word segmentation on the input text to obtain a word segmentation result; and performing boundary correction on first and last positions of the first enhanced text according to the word segmentation result to obtain the target enhanced text.

6. The electronic device according to claim 5, wherein, the instructions are executed by the at least one processor to cause the at least one processor to implement:

in a case that the first or last position of the first enhanced text does not match the word segmentation result, supplementing the first or last position of the first enhanced text according to the word segmentation result to obtain the target enhanced text.

7. A non-transitory computer readable storage medium storing computer instructions, wherein the instructions are configured to cause a computer to implement the method according to claim 1.

\* \* \* \* \*